(12) United States Patent
Fujimine et al.

(10) Patent No.: US 9,216,374 B2
(45) Date of Patent: Dec. 22, 2015

(54) GAS SEPARATION DEVICE AND GAS SEPARATION METHOD

(71) Applicants: Tomoya Fujimine, Kanagawa (JP); Yoshifumi Nakashima, Tokyo (JP); Jun Izumi, Nagasaki (JP); Norio Miura, Fukuoka (JP); Tadashi Taniuchi, Chiba (JP); Manabu Kuroki, Chiba (JP)

(72) Inventors: Tomoya Fujimine, Kanagawa (JP); Yoshifumi Nakashima, Tokyo (JP); Jun Izumi, Nagasaki (JP); Norio Miura, Fukuoka (JP); Tadashi Taniuchi, Chiba (JP); Manabu Kuroki, Chiba (JP)

(73) Assignees: TOKYO GAS CO., LTD., Tokyo (JP); ADSORPTION TECHNOLOGY INDUSTRIES, LTD., Omura-shi (JP); KYUSHU UNIVERSITY, NATIONAL UNIVERSITY CORPORATION, Fukuoka (JP); JNC ENGINEERING CO. LTD., Chiba-shi (JP)

( * ) Notice: Subject to any disclaimer, the term of this patent is extended or adjusted under 35 U.S.C. 154(b) by 0 days.

(21) Appl. No.: 14/407,558

(22) PCT Filed: Jun. 14, 2013

(86) PCT No.: PCT/JP2013/066448
§ 371 (c)(1),
(2) Date: Dec. 12, 2014

(87) PCT Pub. No.: WO2013/191097
PCT Pub. Date: Dec. 27, 2013

(65) Prior Publication Data
US 2015/0151239 A1    Jun. 4, 2015

(30) Foreign Application Priority Data

Jun. 19, 2012    (JP) ................................. 2012-137888

(51) Int. Cl.
*B01D 53/04*    (2006.01)
*C01B 13/02*    (2006.01)
(Continued)

(52) U.S. Cl.
CPC .............. *B01D 53/047* (2013.01); *B01D 53/04* (2013.01); *B01D 53/0438* (2013.01);
(Continued)

(58) Field of Classification Search
CPC .. B01D 53/04; B01D 53/047; B01D 53/0438; B01D 53/0454; B01D 2253/1124; B01D 2256/10; B01D 2257/104; B01D 2259/40007; B01D 2259/402
USPC ........ 95/96, 106, 114, 115, 138; 96/121, 126, 96/146
See application file for complete search history.

(56) References Cited

U.S. PATENT DOCUMENTS

| | | | |
|---|---|---|---|
| 2,661,808 A | 12/1953 | Kahle | |
| 4,398,927 A * | 8/1983 | Asher et al. | ...................... 95/104 |
| 5,989,314 A * | 11/1999 | Schaub et al. | .................... 95/96 |

FOREIGN PATENT DOCUMENTS

| | | |
|---|---|---|
| DE | 10 2004 063613 | 7/2006 |
| JP | 48-022353 A | 3/1973 |

(Continued)

OTHER PUBLICATIONS

International Search Report for PCT/JP2013/066448 dated Aug. 20, 2013 [PCT/ISA/210].

(Continued)

*Primary Examiner* — Frank Lawrence
(74) *Attorney, Agent, or Firm* — Sughrue Mion, PLLC

(57) ABSTRACT

The gas separation device includes an adsorption tower having at least one part thereof exposed to an atmosphere at a higher or lower temperature than normal temperature, a mixed gas feed unit, an adsorbent provided inside the adsorption tower to adsorb a matter contained in a mixed gas upon contact with the mixed gas in a prescribed pressure and temperature environment, and separate the matter from the mixed gas, a separated gas discharge unit that discharges a separated gas from the adsorption tower, and an adsorbed gas discharge unit that discharges from the adsorption tower the adsorbed gas which is adsorbed by the adsorbent. Heat reserving elements are arranged in the adsorption tower at positions upstream and downstream of the adsorbent in the mixed gas supply direction respectively such that the mixed gas, separated gas, and adsorbed gas flow through the heat reserving elements.

50 Claims, 6 Drawing Sheets

(51) Int. Cl.
- *B01D 53/047* (2006.01)
- *B01J 20/06* (2006.01)
- *C01B 21/04* (2006.01)
- *C01B 23/00* (2006.01)
- *B01J 20/04* (2006.01)
- *B01J 20/34* (2006.01)
- *B01D 53/34* (2006.01)

(52) U.S. Cl.
CPC ......... *B01D 53/0454* (2013.01); *B01D 53/343* (2013.01); *B01J 20/041* (2013.01); *B01J 20/06* (2013.01); *B01J 20/34* (2013.01); *B01J 20/3433* (2013.01); *B01J 20/3491* (2013.01); *C01B 13/02* (2013.01); *C01B 13/0259* (2013.01); *C01B 21/04* (2013.01); *C01B 21/045* (2013.01); *C01B 23/0052* (2013.01); *B01D 2253/1124* (2013.01); *B01D 2256/10* (2013.01); *B01D 2257/104* (2013.01); *B01D 2259/402* (2013.01); *B01D 2259/40007* (2013.01); *B01D 2259/655* (2013.01); *B01J 2220/606* (2013.01); *C01B 2210/0034* (2013.01); *C01B 2210/0037* (2013.01)

(56) References Cited

FOREIGN PATENT DOCUMENTS

| JP | 10-263352 A | 10/1998 |
|----|-------------|---------|
| JP | 2008-012439 A | 1/2008 |

OTHER PUBLICATIONS

Written Opinion for PCT/JP2013/066448 dated Aug. 20, 2013 [PCT/ISA/237].

Extended European Search Report issued Aug. 31, 2015 in European Patent Application No. 13806229.4.

* cited by examiner

FIG.3

|  |  | First adsorption Step | First regeneration step | Second adsorption Step | Second regeneration step |
|---|---|---|---|---|---|
| 110a | 124a(Mixed gas) | ○ | × | × | × |
|  | 144a(Separated gas) | × | × | ○ | × |
|  | 154a(Adsorbed Gas) | × | ○ | × | × |
|  | 124b(Mixed gas) | × | × | ○ | × |
|  | 144b(Separated gas) | ○ | × | × | × |
|  | 154b(Adsorbed Gas) | × | × | × | ○ |
| 110b | 124c(Mixed gas) | ○ | × | × | × |
|  | 144c(Separated gas) | × | × | ○ | × |
|  | 154c(Adsorbed Gas) | × | ○ | × | × |
|  | 124d(Mixed gas) | × | × | ○ | × |
|  | 144d(Separated gas) | ○ | × | × | × |
|  | 154d(Adsorbed Gas) | × | × | × | ○ |

GAS SEPARATION DEVICE AND GAS SEPARATION METHOD

CROSS REFERENCE TO RELATED APPLICATIONS

This application is a National Stage of International Application No. PCT/JP2013/066448 filed Jun. 14, 2013, claiming priority based on Japanese Patent Application No. 2012-137888 filed Jun. 19, 2012, the contents of all of which are incorporated herein by reference in their entirety.

TECHNICAL FIELD

The present invention relates to a gas separation device and a gas separation method to separate a desired (predetermined) gas from a mixed gas.

BACKGROUND ART

One of conventional and known technologies to separate a desired (predetermined) gas from a mixed gas is a PSA (Pressure Swing Adsorption) method. The PSA method is a separation method that takes advantage of a fact that an amount of gas to be adsorbed by an adsorbent (adsorption agent) varies with the type of the gas concerned, and a partial pressure of the substance (gas) concerned. When the PSA method is used, a mixed gas is introduced to an adsorption tower, which is filled with an adsorbent, to cause the adsorbent to selectively adsorb a predetermined gas contained in the mixed gas (adsorption step). After the predetermined gas is adsorbed by the adsorbent, the predetermined gas is desorbed from the adsorbent (recovering or regeneration step). In the PSA method, a pressure difference is forcibly created between the adsorption step and the regeneration step to separate the predetermined gas from the mixed gas.

In recent years, a PSA method that uses an adsorbent made from a perovskite-type oxide is disclosed as a PSA method-based technology for efficiently separating oxygen from the air (for example, Patent Literature 1).

LISTING OF REFERENCE(S)

Patent Literature(s)

PATENT LITERATURE 1: Japanese Patent Application Laid-Open Publication No. 2008-12439

SUMMARY OF THE INVENTION

Problems to be Solved by the Invention

In the PSA method using the perovskite-type oxide as described in Patent Literature 1, the adsorption step and the regeneration step need to be carried out at a high temperature such as between 250 degrees C. and 900 degrees C. For this reason, the adsorbent (adsorption tower) should be heated to a predetermined temperature and maintained at a predetermined temperature. As such, a thermal energy is required for heating and maintaining the temperature. Therefore, there is a demand for technologies to reduce the running cost that is spent for the thermal energy.

In view of such problem, an object of the present invention is to provide a simple and inexpensive gas separation device and gas separation method.

Solution to the Problems

In order to solve the above-mentioned problem, a gas separation device of the present invention includes: an adsorption tower, at least part of the adsorption tower being exposed to an atmosphere at a temperature higher or lower than a normal temperature; a mixed gas feed unit configured to feed a mixed gas, which contains a plurality of substances, into the adsorption tower from one end or another end of the adsorption tower; an adsorbent disposed in the adsorption tower such that when the adsorbent contacts the mixed gas in a prescribed pressure and temperature environment, the adsorbent adsorbs a substance contained in the mixed gas to separate the substance from the mixed gas; a separated gas discharge unit configured to discharge a separated gas from said one end or said another end of the adsorption tower, the separated gas being produced from the mixed gas upon separation of the substance adsorbed by the adsorbent from the mixed gas; an adsorbed gas discharge unit configured to reduce an inner pressure of the adsorption tower and cause an adsorbed gas, which is adsorbed by the adsorbent, to desorb from the adsorbent so as to discharge the adsorbed gas from an interior of the adsorption tower; heat reserving elements disposed upstream and downstream of the adsorbent in a mixed gas feeding direction such that the mixed gas supplied into the adsorption tower from the mixed gas feed unit, the separated gas discharged from the interior of the adsorption tower by the separated gas discharge unit, and the adsorbed gas discharged from the interior of the adsorption tower by the adsorbed gas discharge unit pass through the heat reserving elements, the heat reserving elements being configured to reduce an outflow of heat to outside from the adsorbent and an inflow of heat to the adsorbent from the outside; and a control unit configured to control a gas separation process that sequentially carries out a feed process of controlling the mixed gas feed unit to feed the mixed gas into the adsorption tower, a separated gas discharge process of controlling the separated gas discharge unit to discharge the separated gas from the interior of the adsorption tower, and an adsorbed gas discharge process of controlling the adsorbed gas discharge unit to discharge the adsorbed gas from the interior of the adsorption tower, the control unit being configured to control the mixed gas feed unit during the feed process such that the mixed gas is fed from that end of the adsorption tower, among said one end and said another end of the adsorption tower, from which the separated gas is discharged in a preceding separated gas discharge process, and the control unit being configured to control the separated gas discharge unit during the separated gas discharge process such that the separated gas is discharged from that end of the adsorption tower which is different from the end used to discharge the separated gas in the preceding separated gas discharge process.

In order to solve the above-mentioned problem, a gas separation device of the present invention includes: an adsorption tower, at least part of the adsorption tower being exposed to an atmosphere at a temperature higher than a normal temperature; a mixed gas feed unit configured to feed a mixed gas, which contains a plurality of substances, into the adsorption tower from one end or another end of the adsorption tower; an adsorbent disposed in the adsorption tower such that when the adsorbent contacts the mixed gas in a prescribed pressure and temperature environment, the adsorbent adsorbs a substance contained in the mixed gas to separate the substance from the mixed gas; a separated gas discharge unit configured to discharge a separated gas from said one end or said another end of the adsorption tower, the separated gas being produced from the mixed gas upon separation of the substance adsorbed by the adsorbent from the mixed gas; an adsorbed gas discharge unit configured to reduce an inner pressure of the adsorption tower and cause an adsorbed gas, which is adsorbed by the adsorbent, to desorb from the adsorbent so as to discharge the adsorbed gas from an interior of the adsorption tower; heat reserving elements disposed upstream and downstream of the adsorbent in a mixed gas feeding direction such that the mixed gas supplied into the adsorption tower from the mixed gas feed unit, the separated gas discharged from the interior of the adsorption tower by the separated gas discharge unit, and the adsorbed gas discharged from the interior of the adsorption tower by the adsorbed gas discharge unit pass through the heat reserving elements; and a control unit configured to control a gas separation process that sequentially carries out a feed process of controlling the mixed gas feed unit to feed the mixed gas into the adsorption tower, a separated gas discharge process of controlling the separated gas discharge unit to discharge the separated gas from the interior of the adsorption tower, and an adsorbed gas discharge process of controlling the adsorbed gas discharge unit to discharge the adsorbed gas from the interior of the adsorption tower, the control unit being configured to control the mixed gas feed unit during the feed process such that the mixed gas is fed from that end of the adsorption tower, among said one end and said another end of the adsorption tower, from which the separated gas is discharged in a preceding separated gas discharge process, in order to impart heat of the separated gas, which is held in the heat reserving element in the preceding separated gas discharge process, to the mixed gas, and the control unit being configured to control the separated gas discharge unit during the separated gas discharge process such that the separated gas is discharged from that end of the adsorption tower which is different from the end used to discharge the separated gas in the preceding separated gas discharge process, in order to cause the heat reserving element to hold the heat of the separated gas.

In order to solve the above-mentioned problem, a gas separation device of the present invention includes: an adsorption tower, at least part of the adsorption tower being exposed to an atmosphere at a temperature higher or lower than a normal temperature; a mixed gas feed unit configured to feed a mixed gas, which contains a plurality of substances (matters), into the adsorption tower; an adsorbent disposed in the adsorption tower such that when the adsorbent contacts the mixed gas at a predetermined pressure and a predetermined temperature (in a prescribed pressure and temperature environment), the adsorbent adsorbs a substance (matter) contained in the mixed gas to separate the substance from the mixed gas; a separated gas discharge unit configured to discharge a separated gas from the adsorption tower, the separated gas being produced from the mixed gas upon separation of the substance adsorbed by the adsorbent from the mixed gas; and an adsorbed gas discharge unit configured to reduce an inner pressure of the adsorption tower and cause a gas, which is adsorbed by the adsorbent (referred to as "adsorbed gas"), to desorb from the adsorbent so as to discharge the adsorbed gas from the adsorption tower. In the adsorption tower, there are provided heat reserving elements (heat storage bodies) at positions upstream and downstream of the adsorbent in a mixed gas feeding direction such that the mixed gas supplied into the adsorption tower from the mixed gas feed unit, the separated gas discharged from an interior of the adsorption tower by the separated gas discharge unit, and the adsorbed gas discharged from the adsorption tower by the adsorbed gas discharge unit pass through the heat reserving elements.

The mixed gas feed unit of the present invention may be able to feed the mixed gas from any one of one end and an opposite end of the adsorption tower, and the separated gas discharge unit may be able to discharge the separated gas from any one of the two ends (one end and the opposite end) of the adsorption tower.

The gas separation device may further include a control unit configured to control a gas separation process that sequentially (chronologically; in a predetermined time series) carries out a feed process of feeding the mixed gas into the adsorption tower of the present invention, a separated gas discharge process of discharging the separated gas from the interior adsorption tower, and an adsorbed gas discharge process of discharging the adsorbed gas from the adsorption tower. The control unit may control the feed process such that the mixed gas is fed from that end of the adsorption tower, among the two ends (one end and the opposite end) of the adsorption tower, from which the separated gas is discharged in a preceding separated gas discharge process.

The control unit of the present invention may discharge the separated gas from one end of the adsorption tower and the adsorbed gas from another end (the opposite end) of the adsorption tower in a single gas separation process.

The heat reserving element (heat storage body) of the present invention may adsorb a substance contained in the mixed gas upon contact with the mixed gas in an environment of a prescribed pressure and a temperature closer to the normal temperature than the adsorbent, thereby separating the substance from the mixed gas.

The heat reserving element of the reference invention may be made from a same member as the adsorbent.

The adsorption tower of the present invention may include a tubular member that has a plurality of linearly extending elongated portions and a folded portion which connects the two elongated portions. The folded portion may have a curved or bent shape.

The elongated portions of the present invention may be arranged in parallel to each other, and the two heat reserving elements located upstream and downstream in the mixed gas feeding direction may be provided in the two elongated portions respectively at those ends of the two elongated portions which are opposite the ends connected to the folded portion.

The adsorbent of the present invention may be a perovskite-type oxide that adsorbs oxygen.

In order to solve the above-mentioned problem, a gas separation method of the present invention is directed to a gas separation method for causing a mixed gas to contact an adsorbent disposed in an adsorption tower in a prescribed pressure and temperature environment, thereby causing the adsorbent to adsorb a substance contained in the mixed gas and separating the substance from the mixed gas, with at least part of the adsorption tower being exposed to an atmosphere at a temperature higher or lower than a normal temperature, heat reserving elements, through which the mixed gas supplied into the adsorption tower, a separated gas discharged from an interior of the adsorption tower, and an adsorbed gas discharged from the interior of the adsorption tower pass, being disposed upstream and downstream of the adsorbent in a mixed gas feeding direction, the heat reserving elements being configured to reduce an outflow of heat to outside from the adsorbent and an inflow of heat to the adsorbent from the outside, said gas separation method comprising repeating: a feed step of feeding the mixed gas into the adsorption tower; an adsorption step of maintaining the interior of the adsorption tower in the prescribed pressure and temperature environment, and causing the adsorbent to adsorb a substance contained in the mixed gas; a separated gas discharge step of discharging a separated gas from the interior of the adsorption tower, the separated gas being produced from the mixed gas upon separation of the substance adsorbed by the adsorbent from the mixed gas; and an adsorbed gas discharge step of reducing an inner pressure of the adsorption tower and causing an adsorbed gas, which is adsorbed by the adsorbent, to desorb from the adsorbent so as to discharge the adsorbed gas from the interior of the adsorption tower, said feed step including feeding the mixed gas from that end of the adsorption tower, among one end and another end of the adsorption tower, from which the separated gas is discharged in a preceding separated gas discharge step, and said separated gas discharge step including discharging the separated gas from the end different from that end of the adsorption tower which is used to discharge the separated gas in the preceding separated gas discharge step.

In order to solve the above-mentioned problem, a gas separation method of the present invention is directed to a gas separation method for causing a mixed gas to contact an adsorbent disposed in an adsorption tower in a prescribed pressure and temperature environment, thereby causing the adsorbent to adsorb a substance contained in the mixed gas and separating the substance from the mixed gas, with at least part of the adsorption tower being exposed to an atmosphere at a temperature higher than a normal temperature, heat reserving elements, through which the mixed gas supplied into the adsorption tower, a separated gas discharged from an interior of the adsorption tower, and an adsorbed gas discharged from the interior of the adsorption tower pass, being disposed upstream and downstream of the adsorbent in a mixed gas feeding direction, said gas separation method comprising repeating: a feed step of feeding the mixed gas into the adsorption tower; an adsorption step of maintaining the interior of the adsorption tower in the prescribed pressure and temperature environment, and causing the adsorbent to adsorb a substance contained in the mixed gas; a separated gas discharge step of discharging a separated gas from the interior of the adsorption tower, the separated gas being produced from the mixed gas upon separation of the substance adsorbed by the adsorbent from the mixed gas; and an adsorbed gas discharge step of reducing an inner pressure of the adsorption tower and causing an adsorbed gas, which is adsorbed by the adsorbent, to desorb from the adsorbent so as to discharge the adsorbed gas from the interior of the adsorption tower, said feed step including feeding the mixed gas from that end of the adsorption tower, among one end and another end of the adsorption tower, from which the separated gas is discharged in a preceding separated gas discharge step, in order to impart heat of the separated gas, which is held in the heat reserving element in the preceding separated gas discharge step, to the mixed gas, and said separated gas discharge step including discharging the separated gas from the end different from that end of the adsorption tower which is used to discharge the separated gas in the preceding separated gas discharge step, in order to cause the heat reserving element to hold the heat of the separated gas.

Advantageous Effects of the Invention

The device of the present invention has a simple structure, but it is still able to reduce the cost incurred in gas separation.

BRIEF DESCRIPTION OF THE DRAWINGS

FIG. 3 shows opening and closing of valves in the respective steps in the gas separation method.

MODE FOR CARRYING OUT THE INVENTION

Figure 1:
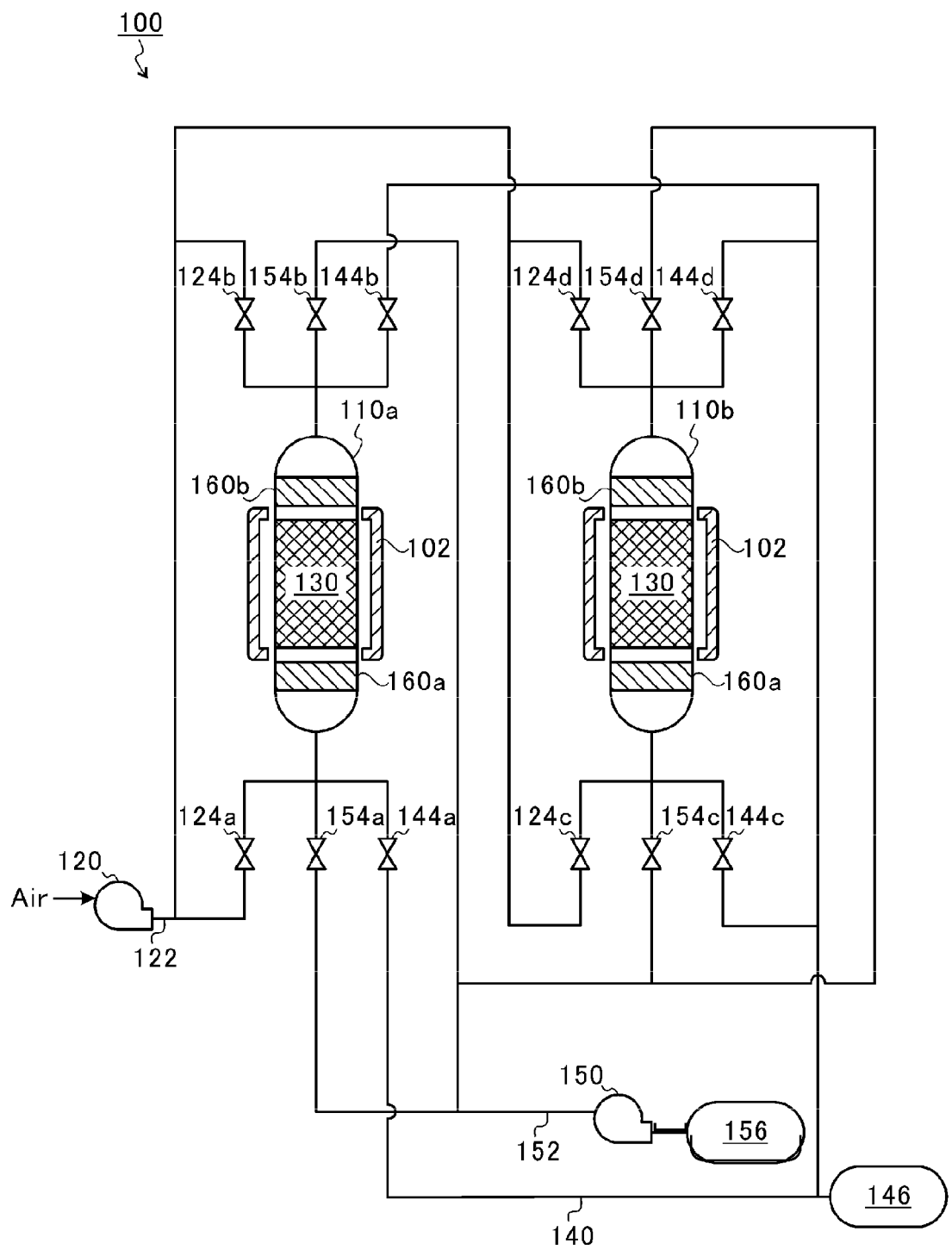
FIG. 1 is a view useful to describe a gas separation device according to a first embodiment.

Preferred embodiments of the present invention will be described in detail with reference to the accompanying drawings. It should be noted that specific dimensions, sizes, materials, values and the like indicated in the embodiments are mere examples for the sake of easier understanding of the present invention, and are not intended to limit the present invention unless otherwise mentioned. In this specification and the accompanying drawings, those elements and components which are substantially the same in function and structure are assigned the same reference numerals and redundant description for such elements and components is omitted. In addition, those elements and components which are not relevant to the present invention are not shown in the drawings.

First Embodiment

Gas Separation Device 100

FIG. 1 is a view useful to describe a gas separation device 100 according to a first embodiment. The gas separation device 100 of this embodiment is a gas separation device that uses a PSA method. The following description deals with an exemplary configuration that separates oxygen and nitrogen independently from the air.

As illustrated in FIG. 1, the gas separation device 100 of this embodiment has adsorption towers 110 (designated at 110a and 110b in FIG. 1). Each of the adsorption towers 110 is shaped like a cylinder. That part of the adsorption tower 110 which has an adsorbent 130 therein (will be described later) is housed in a heat insulation chamber (chamber for maintaining the temperature) 102. The heat insulation chamber 102 maintains the temperature of the adsorbent 130 by exposing the adsorbent 130 to an atmosphere at 250-900 degrees C. (atmosphere at a temperature higher than a normal temperature). In this embodiment, the normal temperature is, for example, 5-30 degrees C. Heat supplied to the heat insulation chamber 102 may be heat that is generated by an electrical heater, by a gas combustion heater, or exhaust heat (waste heat) obtained from a plant in which the gas separation device 100 is installed.

A mixed gas feed unit 120 includes a blower, and is configured to supply a mixed gas (air in this embodiment) that contains a plurality of substances (matters) into the adsorption towers 110. Specifically, the mixed gas feed unit 120 feeds the normal temperature air to the adsorption towers 110 through a feed pipe 122 and valves 124a-124d.

The adsorbent 130 (indicated by the cross hatching in FIG. 1) is disposed in each of the adsorption towers 110. Each adsorption tower 110 is filed up with the adsorbent 130. When the adsorbent 130 contacts the mixed gas at a predetermined pressure and a predetermined temperature (in a prescribed pressure and temperature environment), the adsorbent 130 adsorbs a substance contained in the mixed gas and separates the substance from the mixed gas.

The adsorbent 130 is, for example, a perovskite-type oxide that has a structural formula of $A_{1-x}B_xC_{1-y}D_yO_{3-z}$. In this structural formula, A represents lanthanoid elements or alkaline-earth metal elements, B represents an element dopant for one element selected from the group consisting of lanthanoid elements, alkaline-earth metal elements, and alkaline metal elements, C represents one element or a plurality of elements selected from the group consisting of titanium (Ti), vanadium (V), chromium (Cr), manganese (Mn), iron (Fe), cobalt (Co), nickel (Ni) and zinc (Zn), and D represents one element or a plurality of elements selected from the group consisting of titanium (Ti), vanadium (V), chromium (Cr), manganese (Mn), iron (Fe), cobalt (Co), nickel (Ni), copper (Cu) and zinc (Zn) and is different from C. Specifically, the adsorbent 130 is, for example, $La_{1-x}Sr_xCo_{1-y}Fe_yO_{3-z}$ (La:Sr:Co:Fe=1:9:9:1).

The perovskite-type oxide selectively adsorbs oxygen at a predetermined temperature (e.g., 250-900 degrees C.). This is physical adsorption. Thus, when the perovskite-type oxide is used as the adsorbent 130, it is possible to selectively adsorb oxygen from the air. It is easy for the perovskite-type oxide to adsorb and desorb oxygen if the pressure is altered at the temperature of 250-900 degrees C. The desorption is a phenomenon in which an adsorbed substance leaves an interface.

A separated gas discharge unit 140 discharges nitrogen, which is left when the adsorbent 130 adsorbs oxygen in the air (when oxygen is removed from the air by the adsorbent 130), from the adsorption towers 110. Specifically, the separated gas discharge unit 140 discharges nitrogen from the adsorption towers 110 through valves 144a-144d. Nitrogen discharged by the separated gas discharge unit 140 is sent to a nitrogen tank 146. Nitrogen stored in the nitrogen tank 146 is then sent to a following processing unit or facility.

An adsorbed gas discharging unit 150 includes a vacuum pump, and is configured to reduce an inner pressure of the adsorption tower 110, desorb oxygen, which is adsorbed by the adsorbent 130, from the adsorbent 130 and discharge oxygen from the adsorption tower 110. Specifically, the adsorbed gas discharging unit 150 discharges oxygen from the adsorption tower 110 through a discharge pipe 152 and valves 154a-154d. Oxygen discharged by the adsorbed gas discharging unit 150 is sent to an oxygen tank 156. Oxygen stored in the oxygen tank 156 is then sent to a following processing unit or facility.

Heat storage bodies or heat reserving elements 160 (designated at 160a and 160b and indicated by the hatching in FIG. 1) are arranged upstream and downstream of the adsorbent 130 in each adsorption tower 110 in the air feeding direction. The air supplied to the adsorption tower 110 from the mixed gas feed unit 120, nitrogen discharged from the adsorption tower 110 by the separated gas discharge unit 140, and oxygen discharged from the adsorption tower 110 by the adsorbed gas discharging unit 150 flow through the heat reserving elements 160. In other words, the adsorbent 130 is interposed by the two heat reserving elements 160 in the adsorption tower 110.

Those parts of each adsorption tower 110, which have the heat reserving elements 160, are not housed in the heat insulation chamber 102. The heat reserving elements 160 are exposed to the normal temperature.

Because the heat reserving elements 160a and 160b are disposed on both sides (upstream and downstream sides) of each adsorbent 130 in the fluid (air, nitrogen, and oxygen) flowing direction, it is possible to reduce the outflow of heat from the adsorbent 130 to the outside and the inflow of heat from the outside to the adsorbent 130 to, for example, less than 10%. Therefore, it is possible to reduce an energy to be spent for heating each adsorbent 130, and reduce an electric power source unit to be used for heating the adsorbent 130. As such, nitrogen and oxygen can be produced at a lower cost.

Preferably, each heat reserving element 160 creates a less pressure drop (pressure loss) when the fluid passes through the heat reserving element, and can store (accumulate) a large quantity of heat. For example, each heat reserving element 160 has a honeycomb structure made from a stainless heat-reserving material, with a liner pitch being approximately 2 mm and a plate thickness being approximately 0.5 mm.

The heat reserving element 160 may be made from the same member (material) as the adsorbent 130. With such configuration, the heat reserving element 160 is also able to separate oxygen and nitrogen.

The heat reserving element 160 may be made from a material that adsorbs oxygen and separates nitrogen when the heat reserving element contacts the air at a predetermined pressure and at a temperature that is closer to the normal temperature than the adsorbent 130 (e.g., activated carbon (molecular sieving carbon or MSC), or an adsorbent such as a composite oxide that is active at a low temperature). This makes it possible to separate oxygen and nitrogen in the heat reserving element 160 more efficiently.

Gas Separation Method

Figure 2:
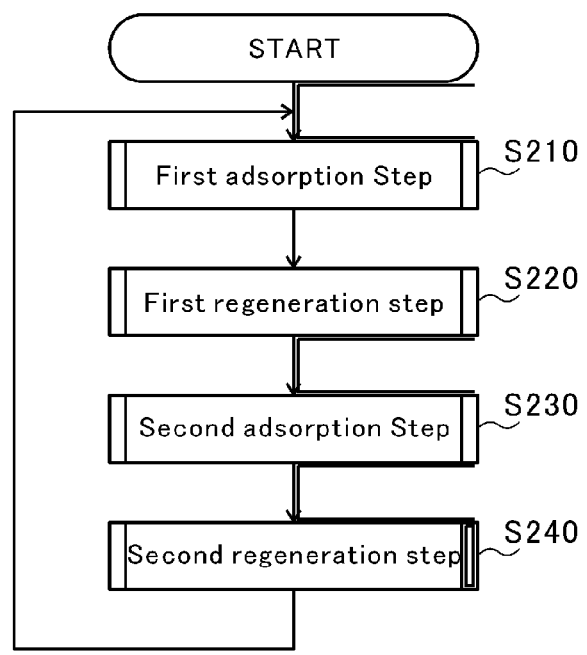
FIG. 2 is a flowchart useful to describe a sequence of steps in a gas separation method.

Now, a gas separation method which uses the gas separation device 100 will be described. FIG. 2 shows a flowchart useful to describe the processing of the gas separation method. FIG. 3 is a diagram useful to describe opening and closing of the respective valves in the respective steps of the gas separation method.

As illustrated in FIG. 2, a first adsorption step S210, a first regeneration step S220, a second adsorption step S230 and a second regeneration step S240 are repeated in the adsorption tower 110. Under an initial condition, a control unit (not shown) closes the valves 124a-124d, 144a-144d, and 154a-154d, and exposes the adsorbent 130 of the adsorption tower 110 to the atmosphere at 250-900 degrees C.

In this embodiment, while the first adsorption step S210 is being carried out in the adsorption tower 110a, the first regeneration step S220 is carried out in the adsorption tower 110b. While the first regeneration step S220 is being carried out in the adsorption tower 110a, the first adsorption step S210 is carried out in the adsorption tower 110b. While the second adsorption step S230 is being carried out in the adsorption tower 110a, the second regeneration step S240 is carried out in the adsorption tower 110b. While the second regeneration step S240 is being carried out in the adsorption tower 110a, the second adsorption step S230 is carried out in the adsorption tower 110b.

As will be described later, nitrogen is produced in the adsorption step, and oxygen is produced in the regeneration step. As the adsorption towers 110a and 100b exclusively and alternately perform the adsorption step and the regeneration step, it is possible to continuously produce nitrogen and oxygen.

In the following description, the processing from the first adsorption step S210 to the second regeneration step S240 will be described in detail in connection with the adsorption tower 110a. The description of the processing to be performed in the adsorption tower 110b from the first adsorption step S210 to the second regeneration step S240 is omitted as the processing of the adsorption tower 110b is substantially the same as the processing of the adsorption tower 110a.

First Adsorption Step: Step S210

Figure 4:
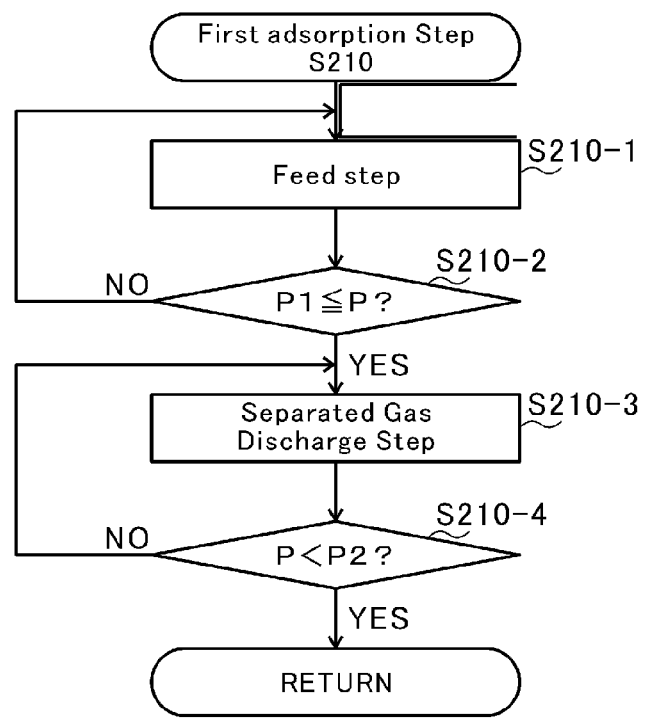
FIG. 4 is a flowchart useful to describe a series of sub-steps in a first adsorption step.

FIG. 4 shows a flowchart to describe the processing in the first adsorption step S210.

Feed Step: Step S210-1

The control unit (not shown) drives the mixed gas feed unit 120, opens the valve 124a (see FIG. 3), and supplies the air into the adsorption tower 110a (feeding process). In other words, the air at the normal temperature arrives at the adsorbent 130 via the heat reserving element 160a.

Adsorption Step: Step S210-2

The control unit determines whether the pressure P in the adsorption tower 110a becomes equal to or more than a predetermined pressure P1 (e.g., 100 kPa to 200 kPa). The control unit carries out the feed step S210-1 until the inner pressure P of the adsorption tower 110a becomes equal to or more than the predetermined pressure P1 (NO at Step S210-2). Oxygen in the air is adsorbed by the adsorbent 130 while the control unit carries out the feeding process and the pressure in the adsorption tower 110a rises to the predetermined pressure P1. On the other hand, when the pressure P in the adsorption tower 110a becomes equal to or more than the predetermined pressure P1 (YES at Step S210-2), the control unit deactivates the mixed gas feed unit 120 and the processing proceeds to the separated gas discharge step S210-3 (will be described).

Separated Gas Discharge Step: Step S210-3

When the pressure P in the adsorption tower 110a becomes equal to or more than the predetermined pressure P1 (YES at Step S210-2), the control unit closes the valve 124a and opens the valve 144b (see FIG. 3). This causes the separated gas discharge unit 140 to discharge nitrogen, which is left upon removal of oxygen adsorbed by the adsorbent 130 from the air, from the adsorption tower 110a (separated gas discharge process). In other words, high temperature (250-900 degrees C.) nitrogen is discharged via the heat reserving element 160b. The heat reserving element 160b at the normal temperature is heated by the high temperature nitrogen. At the same time, the high temperature nitrogen is cooled by the normal temperature heat reserving element 160b. Nitrogen discharged from the adsorption tower 110a is sent to the nitrogen tank 146.

Separated Gas Discharge Determination Step: Step S210-4

Then, the control unit determines whether the pressure P in the adsorption tower 110a becomes lower than a predetermined pressure P2 (e.g., 60 kPa). The control unit carries out the separated gas discharge step S210-3 until the pressure P in the adsorption tower 110a becomes lower than the predetermined pressure P2 (NO at Step S210-4). When the pressure P in the adsorption tower 110a becomes lower than the predetermined pressure P2 (YES at Step S210-4), the control unit determines that the first adsorption step S210 is completed. The processing proceeds to the first regeneration step S220 (will be described below).

First Regeneration Step: Step S220

Figure 5:
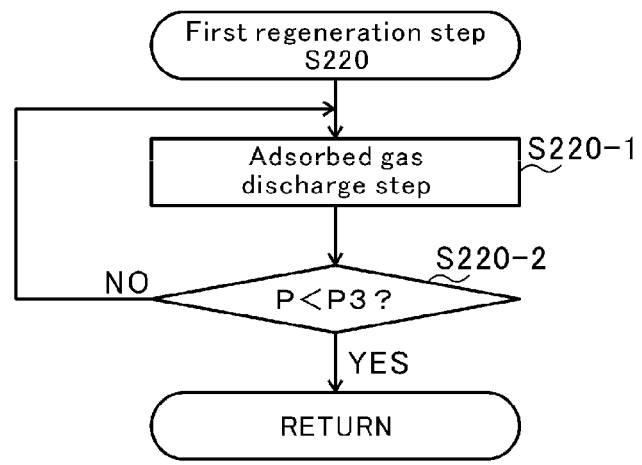
FIG. 5 is a flowchart useful to describe a series of sub-steps in a first regeneration step.

FIG. 5 shows a flowchart useful to describe the processing in the first regeneration step S220.

Adsorbed Gas Discharge Step: Step S220-1

When the above-described separated gas discharge determination step S210-4 determines that the inner pressure P of the adsorption tower 110a is lower than the predetermined pressure P2 (YES at Step S210-4), the control unit closes the valve 144b, opens the valve 154a (see FIG. 3), and drives the adsorbed gas discharge unit 150. This reduces the pressure in the adsorption tower 110a, and causes oxygen, which is adsorbed by the adsorbent 130, to desorb from the adsorbent 130 and to be discharged from the adsorption tower 110a (adsorbed gas discharge step). In other words, the high temperature (250-900 degrees C.) oxygen is discharged via the heat reserving element 160a, and the normal temperature heat reserving element 160a is heated by the high temperature oxygen. At the same time, the high temperature oxygen is cooled by the normal temperature heat reserving element 160a. Oxygen discharged from the adsorption tower 110a is sent to the oxygen tank 156.

Adsorbed Gas Discharge Determination Step: Step S220-2

Then, the control unit determines whether the pressure P in the adsorption tower 110a becomes lower than a predetermined pressure P3 (e.g., 2 kPa to 20 kPa). The control unit carries out the adsorbed gas discharge step S220-1 until the pressure P in the adsorption tower 110a becomes lower than the predetermined pressure P3 (NO at Step S220-2). When the pressure P in the adsorption tower 110a becomes lower than the predetermined pressure P3 (YES at Step S220-2), the control unit determines that the first regeneration step S220 is completed, and closes the valve 154a (see FIG. 3). The processing proceeds to the second adsorption step S230 (will be described below).

As described above, the control unit discharges nitrogen from one end of the adsorption tower 110a and oxygen from the other end (opposite end) of the adsorption tower 110a in a single gas separation process (the first adsorption step S210 and the first regeneration step S220). This enables to heat both of the heat reserving elements 160a and 160b, which are located at the opposite sides (ends) of the adsorbent 130 in the flow direction of the fluid (air, nitrogen and oxygen).

Second Adsorption Step: Step S230

The control unit carries out the adsorption step shown in FIG. 4. The only difference between the adsorption step of FIG. 4 and the second adsorption step lies in that the control unit opens and closes different valves in Steps S210-1 and S210-3. Thus, the following description will describe the valve opening and closing control by the control unit in detail, and omit the detailed description of other control and movements.

In the feed step S210-1 of the second adsorption step S230, the control unit drives the mixed gas feed unit 120 and opens the valve 124b to feed the air into the adsorption tower 110a. Accordingly, the normal temperature air arrives at the adsorbent 130 via the heat reserving element 160b.

Specifically, in the feed step S210-1 of the second adsorption step S230, the control unit feeds the air from that end of the adsorption tower 110a from which nitrogen is discharged in the preceding separated gas discharge step S210-3 (separated gas discharge step S210-3 in the first adsorption step S210), among the two ends (one end and the opposite end) of the adsorption tower 110a. In other words, the control unit causes the air to pass through the heat reserving element 160b, which is heated by the high temperature nitrogen in the preceding step, such that the normal temperature air is heated and then the air reaches the adsorbent 130. Therefore, it is possible to heat the air before the air reaches the adsorbent 130, without using a separate heating device. This can reduce an amount of heating to the adsorbent 130.

In the separated gas discharge step S210-3 of the second adsorption step S230, the control unit closes the valve 124b and opens the valve 144a. This causes the separated gas discharge unit 140 to discharge nitrogen, which is left upon removal of oxygen adsorbed by the adsorbent 130 from the air, from the adsorption tower 110a. In other words, the high temperature (250-900 degrees C.) nitrogen is discharged via the heat reserving element 160a, and the heat reserving element 160a is heated by the high temperature nitrogen.

In this manner, the control unit alternately uses the different passages to feed the high temperature nitrogen between the first adsorption step S210 and the second adsorption step S230. Specifically, the high temperature nitrogen passes through the heat reserving element 160b in the first adsorption step S210 and therefore the heat reserving element 160b is heated in the first adsorption step S210 whereas the high temperature nitrogen passes through the heat reserving element 160a in the second adsorption step S230 and therefore the heat reserving element 160a is heated in the second adsorption step S230.

As described above, the heat reserving element 160a is heated by the high temperature oxygen and the heat reserving element 160b is heated by the high temperature nitrogen during a single gas separation process (first adsorption step S210 and the first regeneration step S220). However, because the ratio of nitrogen to oxygen in the air is approximately 8 to 2, there is a difference (approximately four-fold difference) in the flow rate between the fluids passing through the respective heat reserving elements 160. Accordingly, there is a difference in the amount of heating to be imparted to the heat reserving elements 160.

Thus, in the separated gas discharge step S210-3 of the second adsorption step S230 (separated gas discharge process), the control unit discharges nitrogen from the side which is different from the nitrogen discharging side of the previous separated gas discharge step S210-3 (separated gas discharge step S210-3 of the first adsorption step S210). With such nitrogen discharge, it is possible to heat the heat reserving elements 160a and 160b substantially equally.

Second Regeneration Step: Step S240

The control unit performs the regeneration process shown in FIG. 5. The only difference between the regeneration step of FIG. 5 and the second regeneration step lies in that the control unit opens and closes different valves in Step S220-1. Thus, the following description will describe the valve opening and closing control by the control unit in detail, and omit the detailed description of other control and movements.

In the adsorbed gas discharge step S220-1 of the second regeneration step S240, the control unit closes the valve 144a, opens the valve 154b, and drives the adsorbed gas discharge unit 150. Accordingly, the inner pressure of the adsorption tower 110a is reduced, and oxygen, which is adsorbed by the adsorbent 130, is desorbed from the adsorbent 130, such that oxygen is discharged from the adsorption tower 110a. Thus, the high temperature (250-900 degrees C.) oxygen is discharged through the heat reserving element 160b, and the heat reserving element 160b is heated by this high temperature oxygen.

As described above, the control unit discharges nitrogen from one end of the adsorption tower 110a and discharges oxygen from the other end of the adsorption tower 110a in the single gas separation process (second adsorption step S230 and the second regeneration step S240). This makes it possible to heat both of the heat reserving elements 160a and 160b disposed on the opposite sides of the adsorbent 130 in the flow direction of the fluid (air, nitrogen and oxygen).

If one of the heat reserving elements 160 is looked at, the normal temperature mixed gas (100%) flows through the heat reserving element in the adsorption step, the high temperature oxygen (20%) flows through the heat reserving element in the subsequent regeneration step, the high temperature nitrogen (80%) flows through the heat reserving element in the following adsorption step, and these steps (the adsorption step, the regeneration step and another adsorption step) are repeated. Therefore, an amount of heat that is reserved in one heat reserving element when the high temperature oxygen and the high temperature nitrogen are discharged is substantially the same as an amount of heat that is imparted to the mixed gas from the same heat reserving element when the mixed gas is supplied. Consequently, an amount of heat given to the same heat reserving element from the outside theoretically becomes zero.

Second Embodiment

Gas Separation Device 300

In the above-described first embodiment, each of the adsorption towers 110 of the gas separation device 100 is shaped like a cylinder that has a substantially straight center axis. It should be noted, however, that there is no limitation on the shape of the adsorption tower. In the second embodiment, a gas separation device 300 that includes adsorption towers having a different shape will be described.

Figure 6:
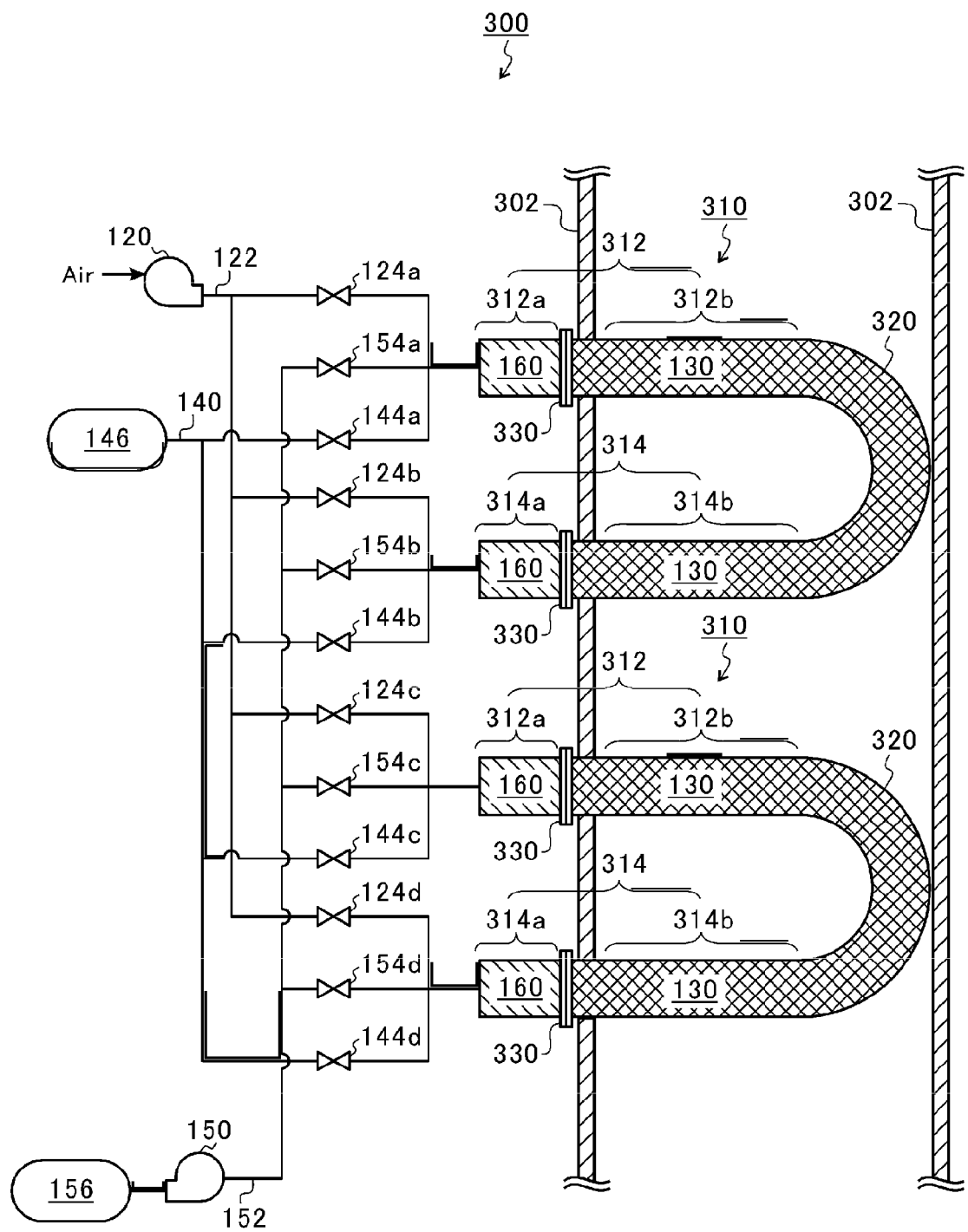
FIG. 6 is a view useful to describe a gas separation device according to a second embodiment.

FIG. 6 is a drawing useful to describe the gas separation device 300 according to the second embodiment. As illustrated in FIG. 6, the gas separation device 300 includes a heat insulation chamber 302, adsorption towers 310, a mixed gas feed unit 120, a feed pipe 122, adsorbents 130, a separated gas discharge unit 140, a nitrogen tank 146, an adsorbed gas discharge unit 150, a discharge pipe 152, an oxygen tank 156, heat reserving elements 160, and valves 124a-124d, 144a-144d, and 154a-154d.

It should be noted that the mixed gas feed unit 120, the feed pipe 122, the adsorbents 130, the separated gas discharge unit 140, the nitrogen tank 146, the adsorbed gas discharge unit 150, the discharge pipe 152, the oxygen tank 156, the heat reserving elements 160 and the valves 124a-124d, 144a-144d and 154a-154d in the second embodiment have substantially the same functions and roles as in the above-described first embodiment. Thus, the redundant description for these elements and components is omitted in the following description. The heat insulation chamber 302 and the adsorption towers 310, which have different configurations from the first embodiment, will mainly be described below.

The heat insulation chamber 302 houses at least those parts of the adsorption towers 310 which are filled with the adsorbents 130 such that the adsorbents 130 are exposed to the atmosphere at 250-900 degrees C.

Each of the adsorption towers 310 includes a tubular member that has a plurality of (two in this embodiment) linearly extending elongated portions 312 and 314 and a folded portion 320 connecting the elongated portion 312 to the elongated portion 314. In this embodiment, the folded portion 320 has a bent shape, and therefore the adsorption tower 310 includes a U-shaped tubular member.

The elongated portion 312 has a first elongated portion 312a and a second elongated portion 312b. The first elongated portion 312a is coupled to the second elongated portion 312b by a flange 330. Likewise, the elongated portion 314 has a first elongated portion 314a and a second elongated portion 314b. The first elongated portion 314a is coupled to the second elongated portion 314b by another flange 330. The adsorbent 130 is disposed in the second elongated portion 312b, the folded portion 320 and the second elongated portion 314b. The interior of the second elongated portion 312b, the folded portion 320 and the second elongated portion 314b is filled up with the adsorbent 130. Also, the second elongated portion 312b, the folded portion 320 and the second elongated portion 314b are housed in the heat insulation chamber 302. On the other hand, the heat reserving elements 160 are disposed in the first elongated portion 312a and the first elongated portion 314a, respectively. The first elongated portions 312a and 314a are situated outside (at the room temperature).

Thus, the adsorbents 130 are disposed in the heat insulation chamber 302, and the heat reserving elements 160 are disposed outside, with the flanges 330 being the boundaries. Accordingly, it is possible to efficiently heat the adsorbents 130 only. Because the heat reserving elements 160 are situated outside (at the room temperature), and the heat reserving elements 160 are coupled to the adsorbents 130 by the flanges 330, the maintenance of the heat reserving elements 160 can be performed easily. In addition, because the valves 124a-124d, 144a-144d and 154a-154d can be placed outside, the valves 124a-124d, 144a-144d and 154a-154d do not have to be expensive valves, which could withstand a high temperature. Thus, the cost of the gas separation device 300 itself can be reduced.

As shown in FIG. 6, the elongated portions 312 and 314 are arranged in parallel to each other in this embodiment. The two heat reserving elements 160 disposed at the upstream side and the downstream side in the air feeding direction are disposed in the two elongated portions 312 and 314 respectively, and situated at those ends of the elongated portions 312 and 314 which are opposite the ends of the elongated portions 312 and 314 to which the folded portion 320 is connected in this embodiment.

This configuration makes it possible to concentrate the fluid feeding mechanism and the fluid discharging mechanism, including the mixed gas feed unit 120, the feed pipe 122, the separated gas discharge unit 140, the nitrogen tank 146, the adsorbed gas discharge unit 150, the discharge pipe 152, the oxygen tank 156, and the valves 124a-124d, 144a-144d and 154a-154d, on the same side face. Therefore, the size of the gas separation device 300 itself can be compact.

Because each adsorption tower 310 has a shape such that the value of "length of the fluid passage of the adsorption tower 310/cross-section of the fluid passage of the adsorption tower 310" becomes large, a piston flow is generated in the adsorption tower 310. This suppresses or prevents oxygen and nitrogen, which are once separated from each other, from mixing with each other again in the adsorption tower 310.

Although the preferred embodiments of the present invention are described in the foregoing with reference to the accompanying drawings, it goes without saying that the present invention is not limited to these embodiments. It is obvious that a skilled person can make or conceive various changes and modifications to the embodiments within the scope of the present invention as claimed. It is natural that such changes and modifications are also encompassed by the present invention.

For example, because the exemplary gas separation device 100 of the above-described embodiment has the two adsorption towers 110a and 110b, the regeneration and the adsorption take place in parallel in the adsorption tower 110a and the adsorption tower 110b in the above-described embodiment. It should be noted, however, that there is no limitation on the number of the adsorption towers as long as the heat reserving elements 160 are disposed on both sides of the adsorbent 130 in the fluid flow direction. In other words, the number of the adsorption towers may be one or may be three or more.

Because the exemplary adsorbent 130 is the perovskite-type oxide in the above-described embodiments, the adsorption towers 110 and 310 are exposed to the atmosphere at a temperature higher than the normal temperature. It should be noted, however, that the adsorbent 130 may be exposed to any atmosphere as long as the atmosphere has a temperature that is suitable for the adsorbent to adsorb a desired substance. For example, when the adsorbent is a Na—K-A zeolite, the adsorption tower may be exposed to an atmosphere at a temperature lower than the normal temperature (e.g., −30 degrees C.). The adsorbent adsorbs oxygen contained in the mixed gas, which is the dry air, and separates nitrogen and argon (Ar). In this example, the pressure used in the adsorption step in the adsorption tower is, for example, 120 kPa (absolute pressure), and the pressure in the regeneration step is 10 kPa (absolute pressure).

When the adsorbent is a Na—X zeolite, the adsorption tower may be exposed to an atmosphere at a temperature lower than the normal temperature (e.g., −30 degrees C.). The adsorbent adsorbs nitrogen contained in the mixed gas, which is the dry air, and separates oxygen and argon (Ar). In this example, the pressure used in the adsorption step in the adsorption tower is, for example, 120 kPa (absolute pressure), and the pressure in the regeneration step is 30 kPa (absolute pressure).

When the adsorbent is the Na—X zeolite, the adsorption tower may be exposed to an atmosphere at a temperature lower than the normal temperature (e.g., −30 degrees C.). The adsorbent adsorbs xenon contained in the mixed gas, which is a combination of the dry air and xenon, and separates the dry air. In this example, the pressure used in the adsorption step in the adsorption tower is, for example, 120 kPa (absolute pressure), and the pressure in the regeneration step is 5 kPa (absolute pressure).

Although the exemplary perovskite-type oxide is $La_{1-x}Sr_xCo_{1-y}Fe_yO_{3-z}$ (La:Sr:Co:Fe=1:9:9:1) in the above-described embodiments, the perovskite-type oxide may be La1-xSrxCo1-yFeyO3-z (La:Sr:Co:Fe=1:9:5:5). An example of the perovskite-type oxide having a different combination of atoms may be $Ba_1Fe_yY_{1-y}O_{3-z}$.

Although each of the folded portions 320 has a curved shape in the above-described embodiment, the folded portion 320 may have a bent shape. For example, the folded portion 320 may be made from an L-shaped, V-shaped or W-shaped tubular member.

In the above-described embodiments, the adsorbent 130 is separate from the heat reserving elements 160. It should be noted, however, that the adsorbent 130 may be continuous to the heat reserving elements 160. For example, when the adsorbent 130 is made from the same member (material) as the heat reserving elements 160, the adsorbent 130 may be formed to be continuous to the heat reserving elements 160.

To compensate for heat radiation from the heat insulation chamber 102, 302, heaters may be disposed in the adsorption towers 110, 310.

INDUSTRIAL APPLICABILITY

The present invention can be used in the gas separation device and the gas separation method to separate a predetermined gas from a mixed gas.

REFERENCE NUMERALS AND SIGNS 100, 300 Gas separation devices
110, 310 Adsorption towers
120 Mixed gas feed unit
130 Adsorbent
140 Separated gas discharge unit
150 Adsorbed gas discharge unit
160 Heat reserving elements
312, 314 Elongated portions
320 Folded portion

The invention claimed is:

1. A gas separation device comprising:
an adsorption tower, at least part of the adsorption tower being exposed to an atmosphere at a temperature higher or lower than a normal temperature;
a mixed gas feed unit configured to feed a mixed gas, which contains a plurality of substances, into the adsorption tower from one end or another end of the adsorption tower;

an adsorbent disposed in the adsorption tower such that when the adsorbent contacts the mixed gas in a prescribed pressure and temperature environment, the adsorbent adsorbs a substance contained in the mixed gas to separate the substance from the mixed gas;

a separated gas discharge unit configured to discharge a separated gas from said one end or said another end of the adsorption tower, the separated gas being produced from the mixed gas upon separation of the substance adsorbed by the adsorbent from the mixed gas;

an adsorbed gas discharge unit configured to reduce an inner pressure of the adsorption tower and cause an adsorbed gas, which is adsorbed by the adsorbent, to desorb from the adsorbent so as to discharge the adsorbed gas from an interior of the adsorption tower;

heat reserving elements disposed upstream and downstream of the adsorbent in a mixed gas feeding direction such that the mixed gas supplied into the adsorption tower from the mixed gas feed unit, the separated gas discharged from the interior of the adsorption tower by the separated gas discharge unit, and the adsorbed gas discharged from the interior of the adsorption tower by the adsorbed gas discharge unit pass through the heat reserving elements, the heat reserving elements being configured to reduce an outflow of heat to outside from the adsorbent and an inflow of heat to the adsorbent from the outside; and a control unit configured to control a gas separation process that sequentially carries out a feed process of controlling the mixed gas feed unit to feed the mixed gas into the adsorption tower, a separated gas discharge process of controlling the separated gas discharge unit to discharge the separated gas from the interior of the adsorption tower, and an adsorbed gas discharge process of controlling the adsorbed gas discharge unit to discharge the adsorbed gas from the interior of the adsorption tower, the control unit being configured to control the mixed gas feed unit during the feed process such that the mixed gas is fed from that end of the adsorption tower, among said one end and said another end of the adsorption tower, from which the separated gas is discharged in a preceding separated gas discharge process, and the control unit being configured to control the separated gas discharge unit during the separated gas discharge process such that the separated gas is discharged from that end of the adsorption tower which is different from the end used to discharge the separated gas in the preceding separated gas discharge process.

2. A gas separation device comprising:
an adsorption tower, at least part of the adsorption tower being exposed to an atmosphere at a temperature higher than a normal temperature;
a mixed gas feed unit configured to feed a mixed gas, which contains a plurality of substances, into the adsorption tower from one end or another end of the adsorption tower;
an adsorbent disposed in the adsorption tower such that when the adsorbent contacts the mixed gas in a prescribed pressure and temperature environment, the adsorbent adsorbs a substance contained in the mixed gas to separate the substance from the mixed gas;
a separated gas discharge unit configured to discharge a separated gas from said one end or said another end of the adsorption tower, the separated gas being produced from the mixed gas upon separation of the substance adsorbed by the adsorbent from the mixed gas;
an adsorbed gas discharge unit configured to reduce an inner pressure of the adsorption tower and cause an adsorbed gas, which is adsorbed by the adsorbent, to desorb from the adsorbent so as to discharge the adsorbed gas from an interior of the adsorption tower;
heat reserving elements disposed upstream and downstream of the adsorbent in a mixed gas feeding direction such that the mixed gas supplied into the adsorption tower from the mixed gas feed unit, the separated gas discharged from the interior of the adsorption tower by the separated gas discharge unit, and the adsorbed gas discharged from the interior of the adsorption tower by the adsorbed gas discharge unit pass through the heat reserving elements; and
a control unit configured to control a gas separation process that sequentially carries out a feed process of controlling the mixed gas feed unit to feed the mixed gas into the adsorption tower, a separated gas discharge process of controlling the separated gas discharge unit to discharge the separated gas from the interior of the adsorption tower, and an adsorbed gas discharge process of controlling the adsorbed gas discharge unit to discharge the adsorbed gas from the interior of the adsorption tower,
the control unit being configured to control the mixed gas feed unit during the feed process such that the mixed gas is fed from that end of the adsorption tower, among said one end and said another end of the adsorption tower, from which the separated gas is discharged in a preceding separated gas discharge process, in order to impart heat of the separated gas, which is held in the heat reserving element in the preceding separated gas discharge process, to the mixed gas, and
the control unit being configured to control the separated gas discharge unit during the separated gas discharge process such that the separated gas is discharged from that end of the adsorption tower which is different from the end used to discharge the separated gas in the preceding separated gas discharge process, in order to cause the heat reserving element to hold the heat of the separated gas.

3. The gas separation device according to claim 1, wherein the control unit discharges the separated gas from said one end of the adsorption tower and the adsorbed gas from said another end of the adsorption tower in a single gas separation process.

4. The gas separation device according to claim 1, wherein each said heat reserving element adsorbs the substance contained in the mixed gas upon contact with the mixed gas in an environment of a prescribed pressure and a temperature closer to the normal temperature than the adsorbent, thereby separating the substance from the mixed gas.

5. The gas separation device according to claim 1, wherein the adsorption tower includes a tubular member that has a plurality of linearly extending elongated portions and a folded portion which connects the two elongated portions, the folded portion having a curved or bent shape.

6. The gas separation device according to claim 5, wherein the plurality of elongated portions are disposed in parallel to each other, and the two heat reserving elements located upstream and downstream in the mixed gas feeding direction are provided in the two elongated portions respectively at those ends of the two elongated portions which are opposite the ends connected to the folded portion.

7. The gas separation device according to claim 1, wherein the adsorbent is a perovskite-type oxide that adsorbs oxygen.

8. A gas separation method for causing a mixed gas to contact an adsorbent disposed in an adsorption tower in a prescribed pressure and temperature environment, thereby causing the adsorbent to adsorb a substance contained in the mixed gas and separating the substance from the mixed gas, with at least part of the adsorption tower being exposed to an atmosphere at a temperature higher or lower than a normal temperature, heat reserving elements, through which the mixed gas supplied into the adsorption tower, a separated gas discharged from an interior of the adsorption tower, and an adsorbed gas discharged from the interior of the adsorption tower pass, being disposed upstream and downstream of the adsorbent in a mixed gas feeding direction, the heat reserving elements being configured to reduce an outflow of heat to outside from the adsorbent and an inflow of heat to the adsorbent from the outside, said gas separation method comprising repeating:

a feed step of feeding the mixed gas into the adsorption tower;

an adsorption step of maintaining the interior of the adsorption tower in the prescribed pressure and temperature environment, and causing the adsorbent to adsorb a substance contained in the mixed gas;

a separated gas discharge step of discharging a separated gas from the interior of the adsorption tower, the separated gas being produced from the mixed gas upon separation of the substance adsorbed by the adsorbent from the mixed gas; and an adsorbed gas discharge step of reducing an inner pressure of the adsorption tower and causing an adsorbed gas, which is adsorbed by the adsorbent, to desorb from the adsorbent so as to discharge the adsorbed gas from the interior of the adsorption tower, said feed step including feeding the mixed gas from that end of the adsorption tower, among one end and another end of the adsorption tower, from which the separated gas is discharged in a preceding separated gas discharge step, and said separated gas discharge step including discharging the separated gas from the end different from that end of the adsorption tower which is used to discharge the separated gas in the preceding separated gas discharge step.

9. A gas separation method for causing a mixed gas to contact an adsorbent disposed in an adsorption tower in a prescribed pressure and temperature environment, thereby causing the adsorbent to adsorb a substance contained in the mixed gas and separating the substance from the mixed gas, with at least part of the adsorption tower being exposed to an atmosphere at a temperature higher than a normal temperature, heat reserving elements, through which the mixed gas supplied into the adsorption tower, a separated gas discharged from an interior of the adsorption tower, and an adsorbed gas discharged from the interior of the adsorption tower pass, being disposed upstream and downstream of the adsorbent in a mixed gas feeding direction, said gas separation method comprising repeating:

a feed step of feeding the mixed gas into the adsorption tower;

an adsorption step of maintaining the interior of the adsorption tower in the prescribed pressure and temperature environment, and causing the adsorbent to adsorb a substance contained in the mixed gas;

a separated gas discharge step of discharging a separated gas from the interior of the adsorption tower, the separated gas being produced from the mixed gas upon separation of the substance adsorbed by the adsorbent from the mixed gas; and an adsorbed gas discharge step of reducing an inner pressure of the adsorption tower and causing an adsorbed gas, which is adsorbed by the adsorbent, to desorb from the adsorbent so as to discharge the adsorbed gas from the interior of the adsorption tower, said feed step including feeding the mixed gas from that end of the adsorption tower, among one end and another end of the adsorption tower, from which the separated gas is discharged in a preceding separated gas discharge step, in order to impart heat of the separated gas, which is held in the heat reserving element in the preceding separated gas discharge step, to the mixed gas, and said separated gas discharge step including discharging the separated gas from the end different from that end of the adsorption tower which is used to discharge the separated gas in the preceding separated gas discharge step, in order to cause the heat reserving element to hold the heat of the separated gas.

10. The gas separation device according to claim 2, wherein the control unit discharges the separated gas from said one end of the adsorption tower and the adsorbed gas from said another end of the adsorption tower in a single gas separation process.

11. The gas separation device according to claim 2, wherein each said heat reserving element adsorbs the substance contained in the mixed gas upon contact with the mixed gas in an environment of a prescribed pressure and a temperature closer to the normal temperature than the adsorbent, thereby separating the substance from the mixed gas.

12. The gas separation device according to claim 2, wherein the adsorption tower includes a tubular member that has a plurality of linearly extending elongated portions and a folded portion which connects the two elongated portions, the folded portion having a curved or bent shape.

13. The gas separation device according to claim 12, wherein the plurality of elongated portions are disposed in parallel to each other, and the two heat reserving elements located upstream and downstream in the mixed gas feeding direction are provided in the two elongated portions respectively at those ends of the two elongated portions which are opposite the ends connected to the folded portion.

14. The gas separation device according to claim 2, wherein the adsorbent is a perovskite-type oxide that adsorbs oxygen.

15. The gas separation device according to claim 3, wherein each said heat reserving element adsorbs the substance contained in the mixed gas upon contact with the mixed gas in an environment of a prescribed pressure and a temperature closer to the normal temperature than the adsorbent, thereby separating the substance from the mixed gas.

16. The gas separation device according to claim 10, wherein each said heat reserving element adsorbs the substance contained in the mixed gas upon contact with the mixed gas in an environment of a prescribed pressure and a temperature closer to the normal temperature than the adsorbent, thereby separating the substance from the mixed gas.

17. The gas separation device according to claim 3, wherein the adsorption tower includes a tubular member that has a plurality of linearly extending elongated portions and a folded portion which connects the two elongated portions, the folded portion having a curved or bent shape.

18. The gas separation device according to claim 4, wherein the adsorption tower includes a tubular member that has a plurality of linearly extending elongated portions and a folded portion which connects the two elongated portions, the folded portion having a curved or bent shape.

19. The gas separation device according to claim 10, wherein the adsorption tower includes a tubular member that has a plurality of linearly extending elongated portions and a folded portion which connects the two elongated portions, the folded portion having a curved or bent shape.

20. The gas separation device according to claim 11, wherein the adsorption tower includes a tubular member that has a plurality of linearly extending elongated portions and a folded portion which connects the two elongated portions, the folded portion having a curved or bent shape.

21. The gas separation device according to claim 15, wherein the adsorption tower includes a tubular member that has a plurality of linearly extending elongated portions and a folded portion which connects the two elongated portions, the folded portion having a curved or bent shape.

22. The gas separation device according to claim 16, wherein the adsorption tower includes a tubular member that has a plurality of linearly extending elongated portions and a folded portion which connects the two elongated portions, the folded portion having a curved or bent shape.

23. The gas separation device according to claim 17, wherein the plurality of elongated portions are disposed in parallel to each other, and the two heat reserving elements located upstream and downstream in the mixed gas feeding direction are provided in the two elongated portions respectively at those ends of the two elongated portions which are opposite the ends connected to the folded portion.

24. The gas separation device according to claim 18, wherein the plurality of elongated portions are disposed in parallel to each other, and the two heat reserving elements located upstream and downstream in the mixed gas feeding direction are provided in the two elongated portions respectively at those ends of the two elongated portions which are opposite the ends connected to the folded portion.

25. The gas separation device according to claim 19, wherein the plurality of elongated portions are disposed in parallel to each other, and the two heat reserving elements located upstream and downstream in the mixed gas feeding direction are provided in the two elongated portions respectively at those ends of the two elongated portions which are opposite the ends connected to the folded portion.

26. The gas separation device according to claim 20, wherein the plurality of elongated portions are disposed in parallel to each other, and the two heat reserving elements located upstream and downstream in the mixed gas feeding direction are provided in the two elongated portions respectively at those ends of the two elongated portions which are opposite the ends connected to the folded portion.

27. The gas separation device according to claim 21, wherein the plurality of elongated portions are disposed in parallel to each other, and the two heat reserving elements located upstream and downstream in the mixed gas feeding direction are provided in the two elongated portions respectively at those ends of the two elongated portions which are opposite the ends connected to the folded portion.

28. The gas separation device according to claim 22, wherein the plurality of elongated portions are disposed in parallel to each other, and the two heat reserving elements located upstream and downstream in the mixed gas feeding direction are provided in the two elongated portions respectively at those ends of the two elongated portions which are opposite the ends connected to the folded portion.

29. The gas separation device according to claim 3, wherein the adsorbent is a perovskite-type oxide that adsorbs oxygen.

30. The gas separation device according to claim 4, wherein the adsorbent is a perovskite-type oxide that adsorbs oxygen.

31. The gas separation device according to claim 5, wherein the adsorbent is a perovskite-type oxide that adsorbs oxygen.

32. The gas separation device according to claim 6, wherein the adsorbent is a perovskite-type oxide that adsorbs oxygen.

33. The gas separation device according to claim 10, wherein the adsorbent is a perovskite-type oxide that adsorbs oxygen.

34. The gas separation device according to claim 11, wherein the adsorbent is a perovskite-type oxide that adsorbs oxygen.

35. The gas separation device according to claim 12, wherein the adsorbent is a perovskite-type oxide that adsorbs oxygen.

36. The gas separation device according to claim 13, wherein the adsorbent is a perovskite-type oxide that adsorbs oxygen.

37. The gas separation device according to claim 15, wherein the adsorbent is a perovskite-type oxide that adsorbs oxygen.

38. The gas separation device according to claim 16, wherein the adsorbent is a perovskite-type oxide that adsorbs oxygen.

39. The gas separation device according to claim 17, wherein the adsorbent is a perovskite-type oxide that adsorbs oxygen.

40. The gas separation device according to claim 18, wherein the adsorbent is a perovskite-type oxide that adsorbs oxygen.

41. The gas separation device according to claim 19, wherein the adsorbent is a perovskite-type oxide that adsorbs oxygen.

42. The gas separation device according to claim 20, wherein the adsorbent is a perovskite-type oxide that adsorbs oxygen.

43. The gas separation device according to claim 21, wherein the adsorbent is a perovskite-type oxide that adsorbs oxygen.

44. The gas separation device according to claim 22, wherein the adsorbent is a perovskite-type oxide that adsorbs oxygen.

45. The gas separation device according to claim 23, wherein the adsorbent is a perovskite-type oxide that adsorbs oxygen.

46. The gas separation device according to claim 24, wherein the adsorbent is a perovskite-type oxide that adsorbs oxygen.

47. The gas separation device according to claim 25, wherein the adsorbent is a perovskite-type oxide that adsorbs oxygen.

48. The gas separation device according to claim 26, wherein the adsorbent is a perovskite-type oxide that adsorbs oxygen.

49. The gas separation device according to claim 27, wherein the adsorbent is a perovskite-type oxide that adsorbs oxygen.

50. The gas separation device according to claim 28, wherein the adsorbent is a perovskite-type oxide that adsorbs oxygen.

* * * * *